United States Patent
Yi et al.

(10) Patent No.: US 11,873,373 B2
(45) Date of Patent: Jan. 16, 2024

(54) PREPARATION METHOD OF RENEWABLE EPOXY ASPHALT MATERIAL AND REGENERATION PROCESS THEREOF

(71) Applicant: Harbin Institute of Technology, Harbin (CN)

(72) Inventors: Junyan Yi, Harbin (CN); Wenyi Zhou, Harbin (CN); Decheng Feng, Harbin (CN); Zhongshi Pei, Harbin (CN); Pengjian Cheng, Harbin (CN); Xinman Ai, Harbin (CN)

(73) Assignee: Harbin Institute of Technology, Harbin (CN)

( * ) Notice: Subject to any disclaimer, the term of this patent is extended or adjusted under 35 U.S.C. 154(b) by 445 days.

(21) Appl. No.: 17/206,985

(22) Filed: Mar. 19, 2021

(65) Prior Publication Data

US 2022/0089832 A1    Mar. 24, 2022

(30) Foreign Application Priority Data

Sep. 18, 2020   (CN) .......................... 202010986392.9

(51) Int. Cl.
*C08L 95/00*   (2006.01)
*C08J 11/26*   (2006.01)

(52) U.S. Cl.
CPC ............. *C08J 11/26* (2013.01); *C08L 95/005* (2013.01); *C08J 2395/00* (2013.01); *C08J 2463/00* (2013.01)

(58) Field of Classification Search
CPC .... C08J 11/26; C08J 2395/00; C08J 2463/00; C08L 95/005
See application file for complete search history.

(56) References Cited

FOREIGN PATENT DOCUMENTS

CN   106832978 A   *   6/2017   .............. C08L 63/00

OTHER PUBLICATIONS

Zhao, S. et al. Recyclable and Malleable Epoxy Thermoset Bearing Aromatic Imine Bonds. Macromolecules 2018, 51, 9816-9824 (Year: 2018).*
Machine translation of CN 106832978 by Hao et al (Year: 2017).*

* cited by examiner

*Primary Examiner* — Michael M Dollinger
*Assistant Examiner* — Christina H. W. Rosebach
(74) *Attorney, Agent, or Firm* — Alliance IP, LLC

(57) ABSTRACT

Disclosed is a preparation method of a renewable epoxy asphalt material and a regeneration process. The preparation method comprises: I Vanillin and 4-aminophenol are reacted in water with stirring to obtain VAN-AP; II. VAN-AP is mixed with epichlorohydrin, to which tetrabutylammonium bromide is added and heated at 80 to 90° C. for reaction; sodium hydroxide solution is then added dropwise for reaction; the mixture is concentrated to obtain GE-VAN-AP; III. Preheated asphalt is mixed with a polyetheramine curing agent and a polyetheramine accelerator to form component A; GE-VAN-AP is melted as component B; the component A is evenly mixed with the component B to obtain a renewable epoxy asphalt material. During the regeneration, the resin phase structure in the epoxy asphalt is gradually depolymerized, whereby asphalt regenerant is used to restore the properties of the aged asphalt phase and reshape the resin phase structure to complete the regeneration.

7 Claims, No Drawings

PREPARATION METHOD OF RENEWABLE EPOXY ASPHALT MATERIAL AND REGENERATION PROCESS THEREOF

CROSS-REFERENCE TO RELATED APPLICATIONS

This Application claims the benefit of priority to Chinese Patent Application Serial No. CN 202010986392.9, which was filed on Sep. 18, 2020. The disclosure of the prior application is considered part of and hereby incorporated by reference in its entirety in the disclosure of this application.

TECHNICAL FIELD

The present disclosure belongs to the field of road engineering, and specifically relates to a preparation method of a renewable epoxy asphalt material and a regeneration process thereof.

BACKGROUND

International and domestic practices and evidence have shown that steel bridges are one of the most effective structural forms of long-span bridges. Steel bridges are widely used as long-span bridges because of their light weight, convenient transportation and erection, and short construction period. The deck pavement of long-span steel bridges at home and abroad is directly laid on the steel deck, which should ensure stable and safe driving conditions for vehicles during the design period. The steel deck pavement layer is in a complex environment, facing the impact of traffic load, temperature changes, sunlight, natural disasters (such as strong winds, earthquakes, and the like), and bridge structure deformation. The steel deck pavement layer is generally made of a Gussasphalt mixture, a stone matrix asphalt mixture, or an epoxy asphalt mixture.

Epoxy asphalt is a high temperature resistant and irreversible thermosetting material formed by mixing asphalt with an epoxy resin, a curing agent and a compatibilizer in a particular ratio, which has high strength and mechanical properties, and therefore, is widely used in the steel deck pavement. In order to achieve a sustainable development, road engineering and construction have gradually transitioned from high consumption to green manufacturing and zero waste. However, once the epoxy resin phase is cured in epoxy asphalt, a three-dimensional crosslinked structure is formed, and cannot be reversed. As a result, epoxy resins, including epoxy asphalt materials, cannot be effectively regenerated. It is foreseeable that even if they are regenerated, they can only be used as aggregates, and cannot be used as high performance, added value resin binders. On this basis, the design of a renewable epoxy asphalt is favorable to the sustainable development of road engineering materials.

SUMMARY

It is an object of the present disclosure to provide a preparation method of a renewable epoxy asphalt material and a regeneration process thereof to address the issue that the existing epoxy asphalt is difficult to regenerate and realize the recycling and reuse of solid waste resources.

The preparation method of a renewable epoxy asphalt material of the present disclosure comprises the following steps:

I Vanillin and 4-aminophenol are reacted in water with stirring in a molar ratio of 1:1 to 1:3, and filtered to collect the solid phase powder, which is washed and dried to obtain VAN-AP;

II. VAN-AP is mixed with epichlorohydrin in a molar ratio of 1:25 to 1:30, to which tetrabutylammonium bromide is added as a phase transfer catalyst to obtain a mixed reactant, which is heated at 80° C. to 90° C. for 2 hours to 3 hours; sodium hydroxide solution is then added dropwise, and reacted for 1.5 hours to 2 hours; the mixture is mixed with ethyl acetate, filtered, dried, and concentrated to obtain GE-VAN-AP;

III. Preheated asphalt is mixed with a polyetheramine curing agent and a polyetheramine accelerator to form component A; GE-VAN-AP is melted at 110° C. to 120° C. as component B; the component A is mixed with the component B in a molar ratio of —$NH_2$ in the polyetheramine to GE-VAN-AP of 1:1, and evenly stirred to obtain a renewable epoxy asphalt material.

According to the principle of the chemical reaction, it can be known that —$NH_2$ and GE-VAN-AP actually should be reacted in a molar ratio of 2:1. However, during the preparation of epoxy asphalt, the presence of asphalt influences the ratio of the curing reaction. Hence, in the present disclosure, the component A and the component B are mixed in a molar ratio of —$NH_2$ in the polyetheramine to GE-VAN-AP of 1:1.

The regeneration process of a renewable epoxy asphalt material of the present disclosure comprises the following steps:

I. Dimetheylformide ("DMF") and a concentrated hydrochloric acid solution are added to an aged renewable epoxy asphalt, heated to 60° C. to 70° C., and stirred until the aged renewable epoxy asphalt is dissolved to obtain a homogeneous solution;

II. The homogeneous solution is stirred with airflow under heating, evaporated to remove DMF and HCl, and subjected to vacuum drying to obtain an aged asphalt polymer gel;

III. A regenerant containing a diffusion component and a cementing component to the aged asphalt polymer gel under heating to complete the regeneration of the renewable epoxy asphalt material.

In the preparation method of a renewable epoxy asphalt material of the present disclosure, a matrix asphalt, a polyetheramine curing agent and a special polyetheramine accelerator are used as the component A of epoxy asphalt, and a new epoxy resin containing imine bond is used as the component B of epoxy asphalt for the preparation of epoxy asphalt. During regeneration, based on the imine bond exchange reaction, the resin phase structure in the epoxy asphalt is gradually depolymerized, whereby asphalt regenerant is used to restore the properties of the aged asphalt phase and reshape the resin phase structure to eventually complete the regeneration.

DETAILED DESCRIPTION

Example 1: The preparation method of a renewable epoxy asphalt material of this example comprises the following steps:

I Vanillin and 4-aminophenol are reacted in water with stirring in a molar ratio of 1:1 to 1:3, and filtered to collect the solid phase powder, which is washed and dried to obtain VAN-AP;

II. VAN-AP is mixed with epichlorohydrin in a molar ratio of 1:25 to 1:30, to which tetrabutylammonium bromide is added as a phase transfer catalyst to obtain a mixed reactant, which is heated at 80° C. to 90° C. for 2 hours to 3 hours; sodium hydroxide solution is then added dropwise, and reacted for 1.5 hours to 2 hours; the mixture is mixed with ethyl acetate, filtered, dried, and concentrated to obtain GE-VAN-AP;

III. Preheated asphalt is mixed with a polyetheramine curing agent and a polyetheramine accelerator to form component A; GE-VAN-AP is melted at 110° C. to 120° C. as component B; the component A is mixed with the component B in a molar ratio of —$NH_2$ in the polyetheramine to GE-VAN-AP of 1:1, and evenly stirred to obtain a renewable epoxy asphalt material.

The preparation method of a renewable epoxy asphalt material of this example first uses vanillin and 4-aminophenol to prepare VAN-AP, which is a bisphenol functional monomer, then uses VAN-AP and epichlorohydrin to prepare GE-VAN-AP, which is an epoxy resin containing active epoxy groups, and mixes the component A (a matrix asphalt, a polyetheramine curing agent and a special polyetheramine accelerator) and the component B (GE-VAN-AP) to prepare epoxy asphalt.

Example 2: This example is different from example 1 in that the time of reaction in water with stirring in step I is 3 hours to 6 hours.

Example 3: This example is different from example 1 or 2 in that the mass concentration of the sodium hydroxide solution in step II is 20%.

Example 4: This example is different from any one of examples 1 to 3 in that the addition amount of tetrabutylammonium bromide in step II is 10% to 15% by mass of VAN-AP.

Example 5: This example is different from any one of examples 1 to 4 in that the concentration in step II comprises using rotary evaporation concentration.

Example 6: This example is different from any one of examples 1 to 5 in that the preheated asphalt in step III is preheated at 160° C. for 1 hour.

Example 7: This example is different from any one of examples 1 to 6 in that the polyetheramine accelerator is DMP-30 accelerator.

Example 8: The regeneration process of a renewable epoxy asphalt material in this example comprises the following steps:
I. DMF and a concentrated hydrochloric acid solution are added to an aged renewable epoxy asphalt, heated to 60° C. to 70° C., and stirred until the aged renewable epoxy asphalt is dissolved to obtain a homogeneous solution;
II. The homogeneous solution is stirred with airflow under heating, evaporated to remove DMF and HCl, and subjected to vacuum drying to obtain an aged asphalt polymer gel;
III. A regenerant containing a diffusion component and a cementing component to the aged asphalt polymer gel under heating to complete the regeneration of the renewable epoxy asphalt material.

Example 9: This example is different from example 8 in that the mass concentration of the concentrated hydrochloric acid solution in step I is 37%.

Example 10: This example is different from example 8 in the regenerant containing a diffusion component and a cementing component in step III, wherein the diffusion component is kerosene and the cementing component is matrix asphalt.

Example 11: This example is different from any one of examples 8 to 10 in that a regenerant containing a diffusion component and a cementing component is added to the aged asphalt polymer gel at 115 to 125° C. in step III.

Example 12: The preparation method of a renewable epoxy asphalt material of this example comprises the following steps:
I. 60.08 g of vanillin and 43.6 g of 4-aminophenol are reacted in water with stirring at room temperature, and filtered to collect the solid phase powder, which is washed and dried to obtain VAN-AP (yellow powder);
II. 24.3 g of VAN-AP is mixed with 250 g of epichlorohydrin, to which 2.6 g of tetrabutylammonium bromide is added as a phase transfer catalyst to obtain a mixed reactant, which is heated at 85° C. for 3 hours; 20 wt % of sodium hydroxide solution is then added dropwise, and reacted for 2 hours; the mixture is mixed with ethyl acetate, filtered to remove the formed sodium chloride, washed with water, dried with $Na_2SO_4$, and concentrated by a rotary evaporator to obtain GE-VAN-AP;
III. Preheated asphalt is mixed with a polyetheramine curing agent and a polyetheramine accelerator DMP-30 to form component A; GE-VAN-AP is melted at 120° C. as component B; the component A is mixed with the component B in a molar ratio of —$NH_2$ in the polyetheramine to GE-VAN-AP of 1:1, and evenly stirred to obtain a renewable epoxy asphalt material.

The preheated asphalt in step III is preheated in an oven at 160° C. for 1 hour.

Application Example: The regeneration process of a renewable epoxy asphalt material in this example comprises the following steps:
I. DMF and a concentrated hydrochloric acid solution with a mass concentration of 37% are added to an aged renewable epoxy asphalt, heated to 70° C., and stirred until the aged renewable epoxy asphalt gradually dissolves; a homogeneous solution can be obtained after 40 minutes; the resin phase in the epoxy asphalt gradually depolymerizes;
II. The homogeneous solution is stirred with airflow at 80° C.; DMF and HCl are removed by evaporation; residual DMF and HCl are removed by vacuum drying to obtain an aged asphalt polymer gel;
III. A regenerant containing kerosene as a diffusion component and a matrix asphalt as a cementing component to the aged asphalt polymer gel at 120° C. to complete the regeneration of the renewable epoxy asphalt material; after the regeneration, the properties of epoxy asphalt all return to the original state before the aging of the renewable epoxy asphalt.

What is claimed is:
1. A preparation method of a renewable epoxy asphalt material, wherein the preparation method comprises the following steps:
I. reacting vanillin and 4-aminophenol in water via stifling in a molar ratio of 1:1 to 1:3, and filtering to collect the solid phase powder, which is washed and dried to obtain VAN-AP;
II. mixing the VAN-AP with epichlorohydrin in a molar ratio of 1:25 to 1:30, to which tetrabutylammonium bromide is added as a phase transfer catalyst to obtain a mixed reactant, which is heated at 80° C. to 90° C. for 2 hours to 3 hours; adding sodium hydroxide solution dropwise, and reacting for 1.5 to 2 hours; mixing the mixture with ethyl acetate, filtering, drying, and concentrating to obtain GE-VAN-AP; and
III. mixing preheated asphalt with a polyetheramine curing agent and a polyetheramine accelerator to form component A; the GE-VAN-AP is melted at 110° C. to 120° C. as component B; the component A is mixed with the component B in a molar ratio of —$NH_2$ in the polyetheramine to the GE-VAN-AP of 1:1, and evenly stirred to obtain a renewable epoxy asphalt material.

2. The preparation method of a renewable epoxy asphalt material according to claim 1, wherein the stirring of step I comprises stifling for 3 hours to 6 hours.

3. The preparation method of a renewable epoxy asphalt material according to claim 1, wherein the mass concentration of the sodium hydroxide solution in step II is 20%.

4. The preparation method of a renewable epoxy asphalt material according to claim 1, wherein the addition amount of tetrabutylammonium bromide in step II is 10% to 15% by mass of VAN-AP.

5. The preparation method of a renewable epoxy asphalt material according to claim 1, wherein the concentrating in step II comprises using a rotary evaporator.

6. The preparation method of a renewable epoxy asphalt material according to claim 1, wherein the preheated asphalt in step III is preheated at 160° C. for 1 hour.

7. The preparation method of a renewable epoxy asphalt material according to claim 1, wherein the polyetheramine accelerator is a DMP-30 accelerator.

* * * * *